Sept. 22, 1942. F. R. VAN DER WOUDE 2,296,751
DRIVE FOR TURNTABLES
Filed April 6, 1940
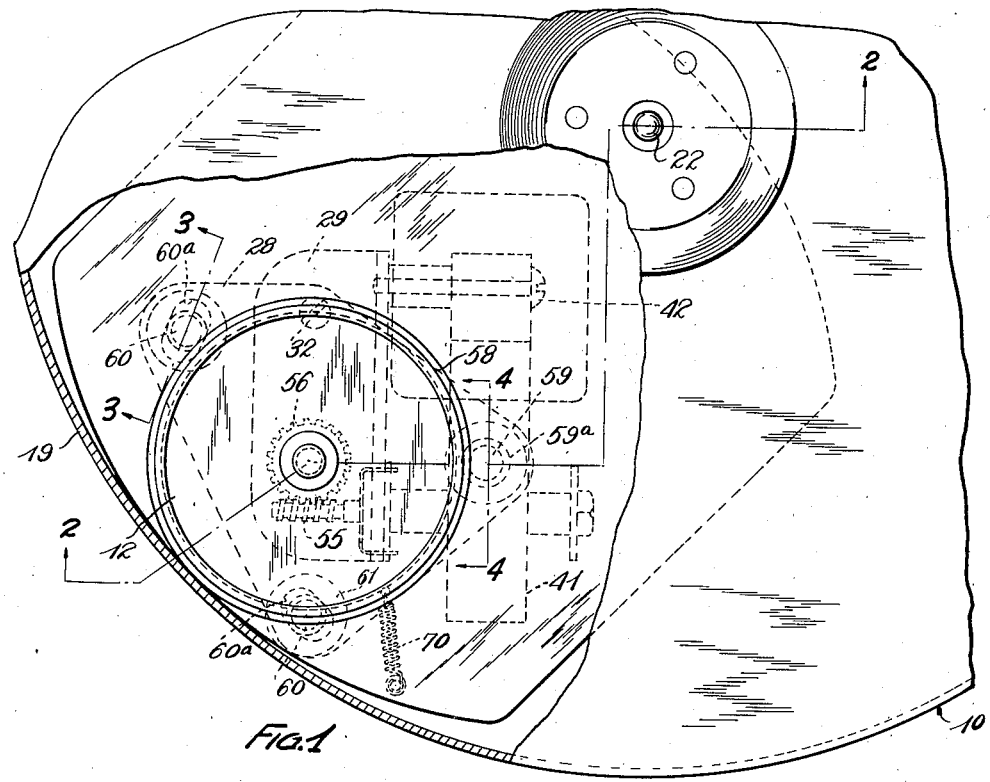
Fig.1
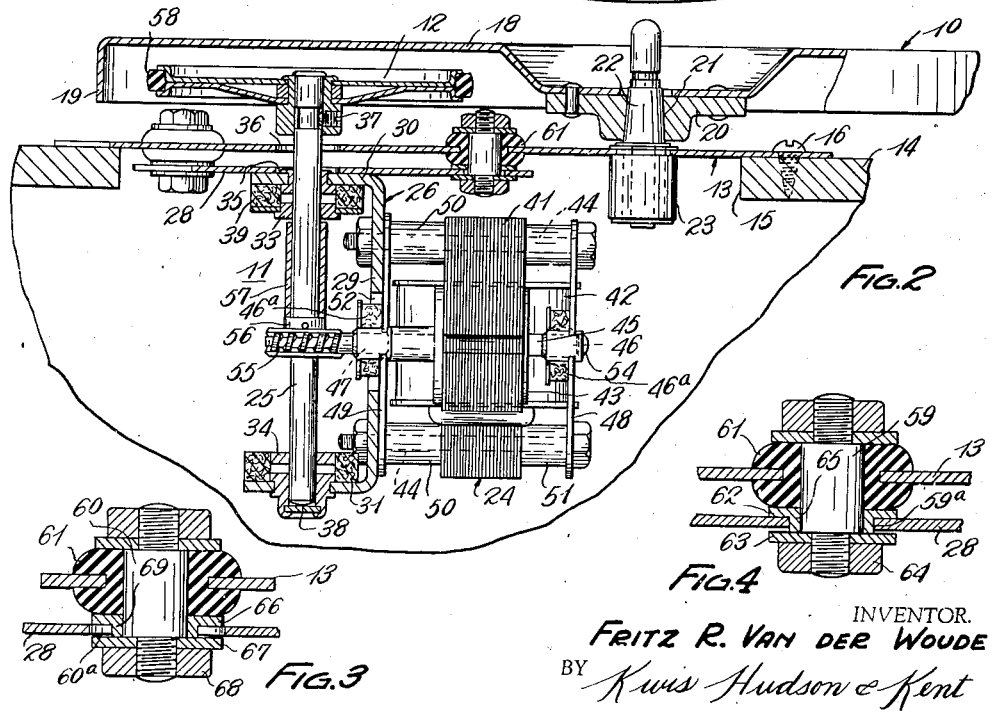
Fig.2
Fig.3
Fig.4
INVENTOR.
FRITZ R. VAN DER WOUDE
BY Kwis Hudson & Kent
ATTORNEYS Patented Sept. 22, 1942

2,296,751

UNITED STATES PATENT OFFICE 2,296,751

DRIVE FOR TURNTABLES

Fritz R. van der Woude, Elyria, Ohio, assignor to The General Industries Company, Elyria, Ohio, a corporation of Ohio Application April 6, 1940, Serial No. 328,348

3 Claims. (Cl. 74—207)

This invention relates to devices for driving turntables of phonographs or the like, and more particularly to an improved and simplified construction for devices of this kind.

Turntable drives as heretofore constructed have sometimes been provided with an idler wheel for transmitting torque from the shaft of the driving motor to the turntable. In these devices two points of contact must be maintained for the idler wheel, one between the idler wheel and a small driving roller mounted on the motor shaft, and the other between the idler wheel and the turntable and this requires a special mounting arrangement for the idler wheel which will permit such contact to be established and yieldingly maintained. In view of the fact that the motor driving roller must be rotated at many times the rate of rotation of the turntable, the driving roller to accomplish the necessary reduction of turntable rotational speed, must be made of a small diameter, and this fact causes the frictional engagement between the driving roller and the idler wheel to be over a very small area of the engaged roller and wheel peripheries, consequently there is considerable slippage and undue wear of the peripheral rubber tread commonly placed on the rim of the idler wheel which wear being frequently greater at some portions then at other peripheral portions of the rim, the resultant driving of the turntable is irregular causing irregularities in the tonal qualities of the sound of reproduced records carried by the turntable.

It is, therefore, an object of the present invention to provide an improved and simplified turntable drive in which the driving motor is arranged to be connected with the turntable through reduction gearing and a friction roller, which is of substantially greater diameter than the friction roller previously commonly employed to drive the so called idler wheel of prior art structure.

Still another object of my invention is to provide an improved turntable driving device of the character referred to in which only a single friction wheel is employed to frictionally engage the inner surface of a depending peripheral turntable flange, and thereby eliminating the prior undesirable wear-causing small driving roller which previously has been employed to drive such a friction wheel, and I accomplish this by substituting for the small driving roller a worm and spur gear combination interconnecting, and forming the driving conection between, the motor shaft and the relatively large friction wheel which directly engages the turntable peripheral flange and drives the turntable.

Another object of my invention is to provide a compact unitary simple and positively operating assembly of parts for accomplishing the aforesaid objects in a simple, easily installed, economical, and readily replaceable unit.

Another object of my invention is to provide an improved drive for phonograph turntables comprising a worm-gear speed reducing unit, wherein the final drive is effected between a friction roller engaging with the inner surface of the turntable peripheral flange, thereby accomplishing not only a further reduction in the rotational speed of the turntable, but wherein the nature of the frictional contact between the friction wheel and said flange protects the worm gear mechanism from injury upon a sudden stop of the turntable by manual restraint, and also when due to starting of the motor the inertia of the turntable places an undue momentary load upon the worm gear mechanism, the frictional nature of the final driving contact permitting sufficient slippage to protect said worm gear mechanism.

My invention may be further briefly summarized as consisting in certain novel combinations and arrangements of parts hereinafter described, and particularly set out in the appended claims.

In the accompanying sheet of drawings,

Fig. 1 is a partial plan view showing a turntable drive embodying my invention;

Fig. 2 is a sectional elevation taken through the device approximately as indicated by line 2—2 of Fig. 1; and Figs. 3 and 4 are partial vertical sectional views taken through mounting connections for the driving unit as indicated by section lines 3—3 and 4—4, respectively, of Fig. 1 and showing such connections on a somewhat larger scale.

Further reference will now be made to the accompanying drawing, and although the illustrated embodiment of my invention is described hereinafter in considerable detail, it will be understood, of course, that the invention is not limited to this particular embodiment, but is applicable to numerous other devices and arrangements of this character.

As shown in Figs. 1 and 2, my improved turntable driving device comprises in general a rotary turntable 10, a driving unit 11 having a friction roller 12 adapted for cooperation with the turntable, and a base plate or mounting means 13 forming a common support for the turntable and the driving unit. Turntable driving devices of this character are commonly embodied in phonographs and recording devices wherein the rotary turntable carries a record or record blank. When embodied in machines of this character, the turntable driving device is usually supported on the top or a wall 14 of the cabinet with the driving unit 11 extending through an opening 15 of such top or wall. The base plate or support 13 may comprise a substantially flat plate-like member of appropriate size and shape arranged to span the opening 15 and adapted to be connected with the top or wall 14 by suitable screws 16.

The turntable 10 may comprise a disk-like member or plate 18 having a depending peripheral flange 19 and a central hub 20. The hub may have a tapered opening 21 adapted to seat on a tapered spindle 22 which is rotatably mounted in a bushing 23 connected with the base plate 13 and depending from the underside thereof.

The driving unit 11 comprises an electric motor 24, a shaft 25 for the friction roller 12, and a carrier 26 which supports the motor and in which the shaft 25 is rotatable. The carrier 26 may be of any appropriate shape or construction and, as here shown, may comprise a plate portion or member 28 disposed adjacent the base plate 13 and a bracket portion or member 29 depending therefrom and with which the electric motor 24 is suitably connected. The depending bracket portion 29 may have deflected end portions forming a pair of substantially parallel spaced arms 30 and 31 and may be connected with the plate portion 28 by having the arm portion 30 thereof connected with such plate portion as by welding or by one or more screws 32.

The shaft 25 may be rotatably mounted in the bracket portion 29 of the carrier 26 by means of upper and lower bearings 33 and 34 carried, respectively, by the arm portions 30 and 31. This shaft projects beyond the upper bearing 33 and extends through openings 35 and 36 of the plate portion 28 and the base plate 13. The friction roller 12 is mounted on the projecting portion of the shaft 25 above the base plate 13 and may be connected therewith as by means of the set screw 37. The lower end of the shaft 25 may seat against a transverse element or portion 38 provided in the bearing 34 and forming a thrust bearing for this shaft. Lubricating means for the upper and lower bearings 33 and 34 may be provided in the form of lubricant impregnated felt washers 39 disposed around these bearings.

The driving motor 24 may be an electric motor of the shaded-pole type comprising a laminated field core 41 having an energizing coil or field winding 42 thereon and provided with an opening in which the rotor 43 is operable. The frame of the motor may also include posts 44 in the form of screws or bolts which extend through the field core 41 and through the bracket portion 29 of the carrier 26 for mounting the motor thereon. The rotor 43 is connected with a shaft 45 which may be rotatably supported by spaced bearings 46 and 47.

These shaft bearings may be carried, respectively, by bars or plates 48 and 49 which extend transversely of the rotor opening and are located on opposite sides of the field core 41. Each of these bearings may be surrounded by a lubricant impregnated felt washer 46a. The plates 48 and 49 may be mounted on the posts 44 with spacers 50 and 51 of appropriate length disposed between them and the field core 41. The bracket portion 29 may be provided at an intermediate point with an opening 52 of suitable size to accommodate the shaft bearing 47 and its lubricating means. A tubular spacer 53 may be provided on the motor shaft between the rotor and the plate 49 to prevent axial shifting of the rotor toward the left, as seen in Fig. 2. Shifting of the rotor in the opposite direction may be limited or prevented by an end thrust bearing 54 incorporated in the shaft bearing 46.

The shaft 25 may be connected with the motor shaft 45 by suitable speed reducing gearing such as the worm and gear elements 55 and 56 shown in this instance. The worm 55 may be provided on the motor shaft 45 outwardly of the bearing 47 and the worm gear 56 may be pinned or otherwise connected with the shaft 25 in meshing relation with the worm. A tubular spacer 57 disposed on the shaft 25 between the upper bearing 33 and the worm gear 56 assists the thrust bearing 38 in preventing axial shifting of this shaft.

The friction roller 12 carried by the shaft 25 may be of any sufficient size to minimize wear and, as here shown, may be a disk-like member or wheel having a soft rubber tire or rim 58 thereon for frictional driving engagement with the turntable flange 19.

As above indicated, the driving unit 11 is laterally shiftable for bringing the rim 58 of the roller 12 into contact with the flange of the turntable. To this end I provide pivotal and guiding connections between the plate portion 28 of the carrier 26 and the base plate 13. These connections may comprise pins or studs 59 and 60, in this instance three such pins, mounted in openings of the base plate 13 by means of vibration absorbing soft rubber bushings 61. These pins also extend through openings of the plate portion 28 of the carrier, one of these openings 59a being a circular pivot opening and the other two openings 60a being slotted or elongated to permit limited swinging of the carrier for shifting the friction roller 12 toward the turntable flange.

The pivotal connection formed by the pin 59 may also include a pair of washers 62 and 63 disposed on opposite sides of the plate portion 28 and retained on the pin 59 by means of the nut 64. The washer 62 may have a sleeve or spacer portion 65 of a length to prevent binding of the washers against the plate portion 28 when the nut 64 is tightened.

The connections formed by the pins 60 may each include a pair of washers 66 and 67 disposed on opposite sides of the plate portion 28 and serving as a means for guiding this plate portion during the swinging of the carrier 26. The washers 66 and 67 may be retained on the pins 60 by nuts 68 and the washer 66 may have a sleeve or spacer portion 69 of a length to prevent the washers from binding on the plate portion when the nuts 68 are tightened.

With the turntable drive arrangement which I have illustrated and described, it will be seen that the driving unit 11 is mounted on the base plate 13 so that swinging of this unit about the axis of the pin 59 can take place to cause the friction roller 12 to contact the turntable flange 19. A tension spring 70 may be arranged to act on the carrier 26 in a direction to normally hold the rim of the friction roller 12 against the turntable flange. It will also be seen that my driving arrangement is relatively simplified as compared with similar devices embodying an idler wheel and the special mounting usually required for such idler wheel. Moreover, it will be seen that with the exception of the friction roller 12, the driving unit 11 can be preassembled and can be mounted on the base plate 13 by simply inserting the pins 59 and 60 through the rubber bushings 61 of the base plate.

While I have illustrated and described my improved turntable driving device in a more or less detailed manner, it will be understood, of course, that I do not wish to be limited to the details of construction and the arrangements herein disclosed, but regard my invention as including such changes and modifications as do not constitute a departure from the spirit of the invention and the scope of the appended claims.

Having thus described my invention, I claim:

1. Unitary driving mechanism for phonograph turntables of the type wherein a turntable having a pendant peripheral flange is rotatably supported on the upper side of a mounting plate, a unitary motor and speed reducing motor driven transmission for rotating the turntable comprising a rubber tired friction wheel within and adjacent to the turntable flange, a carrier plate disposed parallel to the mounting plate, at least three shock mounting units interconnecting the plates, one of the shock units comprising a pivotal connection for one portion of the plate near its border, and the other of said mounts permitting a limited lateral sliding movement of the adjacent border portions of the plate relative to the other mounts, all of said mounts being disposed near the border edges of the carrier plate and substantially laterally spaced from each other, a vertically extending shaft having its upper end projected through an opening in the carrier plate and a relatively aligned larger clearance opening in the mounting plate whereby its upper end is projected within the turntable flange, said wheel secured by its hub on the upper end of the shaft, a U-shaped bracket, having parallel upper and lower relatively spaced horizontal arms, supporting by its yoke, a motor having a rotor supported by a horizontally extending shaft, said shaft projected between said bracket arms and having its end suitably provided with a spiral worm gear, a gear pinion meshed with said worm gear and secured to said vertical shaft, said bracket providing aligned bearings on said bracket arms for said vertical shaft and providing at its intermediate yoke portion a bearing for said rotor shaft, spring means biasing said carrier plate to a position wherein the tire of said friction wheel makes frictional engagement against the inner surface of the turntable flange, whereby one element of the speed reducing transmission mechanism is afforded by said worm and pinion and another element by the frictional engagement of said wheel with the turntable flange of relatively substantially increased diameter, and whereby slippage between said wheel and said flange protects said worm gear against stresses imposed thereon during the motor starting period and when the turntable is manually and improperly rotated, and whereby the provision of the worm and pinion reduction gearing permits said wheel to be of such large diameter as to effect proper operational frictional driving by said wheel of said turntable.

2. In unitary driving mechanism for phonograph turntables wherein a turntable having a pendant peripheral flange is rotatably supported on the upper side of a mounting plate for rotation effected by frictional engagement of a rotatable friction wheel with the inner surface of said flange, the combination with said wheel, of a motor having a rotor shaft extending in a horizontal plane disposed substantially below the turntable, a vertically extending wheel shaft passed through a clearance opening of substantial size in said plate, the upper end of said wheel shaft, disposed above the mounting plate, carrying said wheel, a motor and driving mechanism supporting carrier plate, smaller than said mounting plate, disposed closely below and pendantly shock mounted thereon at at least three laterally spaced points, to define a triangle, near its border portion, mounting means for one of said points comprising a pivot connection about which said carrier plate may be laterally swung, the other mounting means permitting lateral shifting of the adjacent portions of the carrier plate, a motor carrying bracket having a vertical intermediate yoke and laterally extending horizontal relatively spaced arms, said arms carrying vertically aligned bearings for said wheel shaft, one of said bearings comprising a thrust type shaft supporting bearing, the upper end of said bracket being rigidly secured to the said carrier plate and said bracket being pendantly supported by the carrier plate, a worm pinion on said rotor shaft, a gear pinion, meshed therewith, on the wheel shaft, and a spring interconnecting both said plates and exerting pressure tending to rotate said carrier plate on its said pivotal mounting to so swing the carrier plate to laterally position said wheel to effect and maintain predetermined frictional pressure engagement between the wheel rim and the inner surface of the turntable flange.

3. In unitary driving mechanism for phonograph turntables wherein a turntable having a pendant peripheral flange is rotatably supported on the upper side of a mounting plate for rotation effected by frictional engagement of a friction wheel with the inner surface of said flange, the combination of a motor having a rotor shaft extending horizontally below the turntable, said motor comprising a frame element having laterally extending vertically spaced extensions and an intermediate portion, the motor rotor shaft projecting horizontally through said intermediate portion, a vertically extending shaft projected through a clearance opening of substantial size through said mounting plate, bearings for said vertical shaft disposed in said motor frame element extensions, said wheel carried on the upper end of said vertical shaft, supporting means comprising a plurality of laterally spaced resilient mounting means for supporting said motor frame element from said mounting plate, means extending from said frame element pivoted on a first of said mounting means for swinging oscillatory movement thereby imparted to said vertical shaft when said frame element is swung on its first said mounting means, means rigidly connected with and bodily movable with said frame element supported by another of said mounting means by such interlocking engagement therewith as to permit lateral sliding movement of the frame element relative to said other mounting means, a gear pinion carried by and rotatable with said vertical shaft, the projecting end of said rotor shaft provided with a worm pinion meshed with said gear pinion, spring means biasing the frame element to a position wherein the peripheral surface of the thereby carried friction wheel makes a predetermined friction pressure engagement against the inner surface of the turntable flange to effect driving of the turntable by the motor through said worm gear and friction wheel, and to permit slipping between the engaged wheel and flange to protect the worm gear and pinion against abnormal stresses imposed thereon as during the sudden starting of the motor or when the turntable is manually improperly rotated, the pinion reduction gearing being of such a predetermined step-down ratio as to permit said wheel to be of such large diameter as to effect efficient non-destructive frictional driving by said wheel, of said turntable.

FRITZ R. van der WOUDE.